(12) United States Patent
McKaskle et al.

(10) Patent No.: US 10,424,102 B2
(45) Date of Patent: Sep. 24, 2019

(54) DIGITAL MEDIA EDITING

(71) Applicant: GoPro, Inc., San Mateo, CA (US)

(72) Inventors: Devin McKaskle, Austin, TX (US); Stephen Trey Moore, San Antonio, TX (US); Ross Chinni, Austin, TX (US)

(73) Assignee: GoPro, Inc., San Mateo, CA (US)

( * ) Notice: Subject to any disclaimer, the term of this patent is extended or adjusted under 35 U.S.C. 154(b) by 1 day.

(21) Appl. No.: 15/424,281

(22) Filed: Feb. 3, 2017

(65) Prior Publication Data

US 2017/0229147 A1 Aug. 10, 2017

Related U.S. Application Data

(60) Provisional application No. 62/291,336, filed on Feb. 4, 2016.

(51) Int. Cl.
*G06T 13/40* (2011.01)
*G11B 27/031* (2006.01)
(Continued)

(52) U.S. Cl.
CPC ............ *G06T 13/40* (2013.01); *G06F 3/0488* (2013.01); *G06F 3/04842* (2013.01);
(Continued)

(58) Field of Classification Search
None
See application file for complete search history.

(56) References Cited

U.S. PATENT DOCUMENTS 5,130,794 A 7/1992 Ritchey
6,337,683 B1 1/2002 Gilbert
(Continued)

FOREIGN PATENT DOCUMENTS

WO 2001020466 3/2001
WO 2009040538 A1 4/2009
WO WO2010071996 A1 7/2010

OTHER PUBLICATIONS

Anticipatory eye movements while watching continuous action across shots in video sequences by Kirkorian, Heather L (Year: 2017).*

(Continued)

*Primary Examiner* — William C Vaughn, Jr.
*Assistant Examiner* — Daniel T Tekle
(74) *Attorney, Agent, or Firm* — Esplin & Associates, PC

(57) ABSTRACT

Implementations are directed to providing an edit profile including one or more suggested edits to a digital video, actions including receiving metadata associated with the digital video, the metadata including data representative of one or more of movement and an environment associated with recording of the digital video, processing the metadata to provide a suggested edit profile including at least one set of effects, the at least one set of effects including one or more effects configured to be applied to at least a portion of the digital video, providing a respective graphical representation of individual effect of the one or more effects within an effect interface, and receiving, through the effect interface, a user selection of a set of effects of the suggested edit profile, and in response, storing, in computer-readable memory, an edit profile comprising the set of effects for application to the digital video.

19 Claims, 5 Drawing Sheets

(51) Int. Cl.
  *G11B 27/34* (2006.01)
  *H04N 21/472* (2011.01)
  *G11B 27/02* (2006.01)
  *H04N 21/414* (2011.01)
  *H04N 21/422* (2011.01)
  *H04N 21/442* (2011.01)
  *H04N 21/4223* (2011.01)
  *H04N 21/4402* (2011.01)
  *G06F 3/0484* (2013.01)
  *G06F 3/0488* (2013.01)
  *G06F 17/24* (2006.01)

(52) U.S. Cl.
  CPC ............ *G06F 17/241* (2013.01); *G11B 27/02* (2013.01); *G11B 27/031* (2013.01); *G11B 27/34* (2013.01); *H04N 21/41407* (2013.01); *H04N 21/4223* (2013.01); *H04N 21/42224* (2013.01); *H04N 21/4402* (2013.01); *H04N 21/44218* (2013.01); *H04N 21/47205* (2013.01)

(56) References Cited

U.S. PATENT DOCUMENTS

| | | |
|---|---|---|
| 6,593,956 B1 | 7/2003 | Potts |
| 7,222,356 B1 | 5/2007 | Yonezawa |
| 7,325,199 B1 | 1/2008 | Reid |
| 7,352,952 B2 | 4/2008 | Herberger |
| 7,483,618 B1 | 1/2009 | Edwards |
| 7,890,867 B1 | 2/2011 | Margulis |
| 8,446,433 B1 | 5/2013 | Mallet |
| 8,611,422 B1 | 12/2013 | Yagnik |
| 8,718,447 B2 | 5/2014 | Yang |
| 8,730,299 B1 | 5/2014 | Kozko |
| 8,763,023 B1 | 6/2014 | Goetz |
| 8,910,046 B2 | 12/2014 | Matsuda |
| 8,988,509 B1 | 3/2015 | Macmillan |
| 9,032,299 B2 | 5/2015 | Lyons |
| 9,036,001 B2 | 5/2015 | Chuang |
| 9,077,956 B1 | 7/2015 | Morgan |
| 9,111,579 B2 | 8/2015 | Meaney |
| 9,142,253 B2 | 9/2015 | Ubillos |
| 9,151,933 B2 | 10/2015 | Sato |
| 9,204,039 B2 | 12/2015 | He |
| 9,208,821 B2 | 12/2015 | Evans |
| 9,245,582 B2 | 1/2016 | Shore |
| 9,253,533 B1 | 2/2016 | Morgan |
| 9,317,172 B2 | 4/2016 | Lyons |
| 9,423,944 B2 | 8/2016 | Eppolito |
| 9,473,758 B1 | 10/2016 | Long |
| 9,479,697 B2 | 10/2016 | Aguilar |
| 9,557,885 B2 | 1/2017 | Moore |
| 9,564,173 B2 | 2/2017 | Swenson |
| 2004/0128317 A1 | 7/2004 | Sull |
| 2004/0216173 A1 | 10/2004 | Horoszowski |
| 2005/0025454 A1 | 2/2005 | Nakamura |
| 2005/0084232 A1 | 4/2005 | Herberger |
| 2006/0122842 A1 | 6/2006 | Herberger |
| 2006/0265657 A1 | 11/2006 | Gilley |
| 2007/0074115 A1 | 3/2007 | Patten |
| 2007/0173296 A1 | 7/2007 | Hara |
| 2007/0204310 A1 | 8/2007 | Hua |
| 2007/0230461 A1 | 10/2007 | Singh |
| 2008/0036917 A1 | 2/2008 | Pascarella |
| 2008/0044155 A1 | 2/2008 | Kuspa |
| 2008/0120550 A1 | 5/2008 | Oakley |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0208791 A1 | 8/2008 | Das |
| 2008/0244410 A1 | 10/2008 | Schormann |
| 2008/0253735 A1 | 10/2008 | Kuspa |
| 2008/0313541 A1 | 12/2008 | Shafton |
| 2009/0037818 A1 | 2/2009 | Lection |
| 2009/0088143 A1 | 4/2009 | Kim |
| 2009/0089651 A1 | 4/2009 | Herberger |
| 2009/0213270 A1 | 8/2009 | Ismert |
| 2009/0274339 A9 | 11/2009 | Cohen |
| 2009/0327856 A1 | 12/2009 | Mouilleseaux |
| 2010/0045773 A1 | 2/2010 | Ritchey |
| 2010/0064219 A1 | 3/2010 | Gabrisko |
| 2010/0086216 A1 | 4/2010 | Lee |
| 2010/0104261 A1 | 4/2010 | Liu |
| 2010/0174993 A1 | 7/2010 | Pennington |
| 2010/0183280 A1 | 7/2010 | Beauregard |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0275123 A1 | 10/2010 | Yu |
| 2010/0278504 A1 | 11/2010 | Lyons |
| 2010/0278509 A1 | 11/2010 | Nagano |
| 2010/0281375 A1 | 11/2010 | Pendergast |
| 2010/0281376 A1 | 11/2010 | Meaney |
| 2010/0281385 A1 | 11/2010 | Meaney |
| 2010/0281386 A1 | 11/2010 | Lyons |
| 2010/0287476 A1 | 11/2010 | Sakai |
| 2010/0299630 A1 | 11/2010 | McCutchen |
| 2010/0318660 A1 | 12/2010 | Balsubramanian |
| 2010/0321471 A1 | 12/2010 | Casolara |
| 2011/0025847 A1 | 2/2011 | Park |
| 2011/0069148 A1 | 3/2011 | Jones |
| 2011/0069189 A1 | 3/2011 | Venkataraman |
| 2011/0075990 A1 | 3/2011 | Eyer |
| 2011/0093798 A1 | 4/2011 | Shahraray |
| 2011/0134240 A1 | 6/2011 | Anderson |
| 2011/0173565 A1 | 7/2011 | Ofek |
| 2011/0206351 A1 | 8/2011 | Givoly |
| 2011/0211040 A1 | 9/2011 | Lindemann |
| 2011/0258049 A1 | 10/2011 | Ramer |
| 2011/0258547 A1 | 10/2011 | Symons |
| 2011/0276881 A1 | 11/2011 | Keng |
| 2011/0293250 A1 | 12/2011 | Deever |
| 2011/0320322 A1 | 12/2011 | Roslak |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0079386 A1 | 3/2012 | Kim |
| 2012/0123780 A1 | 5/2012 | Gao |
| 2012/0127169 A1 | 5/2012 | Barcay |
| 2012/0206565 A1 | 8/2012 | Villmer |
| 2012/0311448 A1 | 12/2012 | Achour |
| 2013/0024805 A1 | 1/2013 | In |
| 2013/0044108 A1 | 2/2013 | Tanaka |
| 2013/0058532 A1 | 3/2013 | White |
| 2013/0063561 A1 | 3/2013 | Stephan |
| 2013/0078990 A1 | 3/2013 | Kim |
| 2013/0127636 A1 | 5/2013 | Aryanpur |
| 2013/0136193 A1 | 5/2013 | Hwang |
| 2013/0142384 A1 | 6/2013 | Ofek |
| 2013/0145269 A1 | 6/2013 | Latulipe |
| 2013/0151970 A1 | 6/2013 | Achour |
| 2013/0166303 A1 | 6/2013 | Chang |
| 2013/0191743 A1 | 7/2013 | Reid |
| 2013/0195429 A1 | 8/2013 | Fay |
| 2013/0197967 A1 | 8/2013 | Pinto |
| 2013/0208134 A1 | 8/2013 | Hamalainen |
| 2013/0208942 A1 | 8/2013 | Davis |
| 2013/0215220 A1 | 8/2013 | Wang |
| 2013/0227415 A1* | 8/2013 | Gregg ............... G06F 17/30784 715/723 |
| 2013/0259399 A1 | 10/2013 | Ho |
| 2013/0263002 A1 | 10/2013 | Park |
| 2013/0283301 A1 | 10/2013 | Avedissian |
| 2013/0287214 A1 | 10/2013 | Resch |
| 2013/0287304 A1 | 10/2013 | Kimura |
| 2013/0300939 A1 | 11/2013 | Chou |
| 2013/0308921 A1 | 11/2013 | Budzinski |
| 2013/0318443 A1 | 11/2013 | Bachman |
| 2013/0343727 A1 | 12/2013 | Rav-Acha |
| 2014/0023341 A1 | 1/2014 | Wang |

(56) References Cited

U.S. PATENT DOCUMENTS

| | | |
|---|---|---|
| 2014/0026156 A1 | 1/2014 | Deephanphongs |
| 2014/0043340 A1 | 2/2014 | Sobhy |
| 2014/0064706 A1 | 3/2014 | Lewis, II |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0161351 A1 | 6/2014 | Yagnik |
| 2014/0165119 A1 | 6/2014 | Liu |
| 2014/0169766 A1 | 6/2014 | Yu |
| 2014/0176542 A1 | 6/2014 | Shohara |
| 2014/0179259 A1* | 6/2014 | Liu ............... H04W 4/029 455/404.2 |
| 2014/0181666 A1 | 6/2014 | Moore |
| 2014/0193040 A1 | 7/2014 | Bronshtein |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0232819 A1 | 8/2014 | Armstrong |
| 2014/0245336 A1 | 8/2014 | Lewis, II |
| 2014/0300644 A1 | 10/2014 | Gillard |
| 2014/0328570 A1 | 11/2014 | Cheng |
| 2014/0341528 A1 | 11/2014 | Mahate |
| 2014/0366052 A1 | 12/2014 | Ives |
| 2014/0376876 A1 | 12/2014 | Bentley |
| 2015/0015680 A1 | 1/2015 | Wang |
| 2015/0022355 A1 | 1/2015 | Pham |
| 2015/0029089 A1 | 1/2015 | Kim |
| 2015/0058709 A1 | 2/2015 | Zaletel |
| 2015/0085111 A1 | 3/2015 | Lavery |
| 2015/0154452 A1 | 6/2015 | Bentley |
| 2015/0178915 A1 | 6/2015 | Chatterjee |
| 2015/0186073 A1 | 7/2015 | Pacurariu |
| 2015/0220504 A1 | 8/2015 | Bocanegra Alvarez |
| 2015/0254871 A1 | 9/2015 | Macmillan |
| 2015/0256746 A1 | 9/2015 | Macmillan |
| 2015/0256808 A1 | 9/2015 | Macmillan |
| 2015/0271483 A1 | 9/2015 | Sun |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0375117 A1 | 12/2015 | Thompson |
| 2015/0382083 A1 | 12/2015 | Chen |
| 2016/0005435 A1 | 1/2016 | Campbell |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0088287 A1 | 3/2016 | Sadi |
| 2016/0098941 A1 | 4/2016 | Kerluke |
| 2016/0119551 A1 | 4/2016 | Brown |
| 2016/0217325 A1 | 7/2016 | Bose |
| 2016/0225405 A1 | 8/2016 | Matias |
| 2016/0225410 A1 | 8/2016 | Lee |
| 2016/0234345 A1 | 8/2016 | Roberts |
| 2016/0247535 A1 | 8/2016 | Latulipe |
| 2016/0358603 A1 | 12/2016 | Azam |
| 2016/0366330 A1 | 12/2016 | Boliek |
| 2017/0006214 A1 | 1/2017 | Andreassen |
| 2017/0062016 A1 | 3/2017 | Samra |
| 2017/0242504 A1 | 8/2017 | Hanson |
| 2017/0256288 A1 | 9/2017 | Ai |

OTHER PUBLICATIONS

Transmittal of the International Search Report and the Written Opinion of the International Searching Authority for PCT/US2012/050155 dated Oct. 22, 2012, 7 pages.

Transmittal of the International Preliminary Report on Patentability for PCT/US2012/050155 dated Feb. 20, 2014, 6 pages.

Ernoult, Emeric, 'How to Triple Your YouTube Video Views with Facebook', SocialMediaExaminer.com, Nov. 26, 2012, 16 pages.

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structAVP a ck et. html>.

Han et al., Deep Compression: Compressing Deep Neural Networks with Pruning, Trained Quantization and Huffman Coding, International Conference on Learning Representations 2016, 14 pgs.

He et al., 'Deep Residual Learning for Image Recognition,' arXiv:1512.03385, 2015,12 pgs.

Iandola et al., 'SqueezeNet: AlexNet-level accuracy with 50x fewer parameters and <0.5MB model size', arXiv:1602.07360v3 [cs.CV] Apr. 6, 2016 (9 pgs.).

Ioffe et al., 'Batch Normalization: Accelerating Deep Network Training by Reducing Internal Covariate Shift,' arXiv:1502.03167, 2015, 11 pgs.

Parkhi et al., 'Deep Face Recognition,' Proceedings of the British Machine Vision, 2015,12 pgs.

PCT International Preliminary Report on Patentability for PCT/US2015/023680, dated Oct. 4, 2016, 10 pages.

PCT International Search Reort for PCT/US15/18538 dated Jun. 16, 2015 (2 pages).

PCT International Search Report and Written Opinion for PCT/US15/12086 dated Mar. 17, 2016, 20 pages.

PCT International Search Report and Written Opinion for PCT/US15/18538, dated Jun. 16, 2015, 26 pages.

PCT International Search Report and Written Opinion for PCT/US16/31076, dated Aug. 8, 2016, 19 Pages.

PCT International Search Report for PCT/US15/23680 dated Aug. 3, 2015, 4 pages.

PCT International Search Report for PCT/US15/41624 dated Nov. 4, 2015, 5 pages.

PCT International Search Report for PCT/US17/16367 dated Apr. 14, 2017 (2 pages).

PCT International Written Opinion for PCT/US2015/041624, dated Dec. 17, 2015, 7 Pages.

Ricker, 'First Click: TomTom's Bandit camera beats GoPro with software' Mar. 9, 2016 URL: http://www.theverge. com/2016/3/9/11179298/tomtom-bandit-beats-gopro (6 pages).

Schroff et al., 'Face Net: A Unified Embedding for Face Recognition and Clustering,' IEEE Conference on Computer Vision and Pattern Recognition (CVPR), 2016, 10 pgs.

Tran et al., 'Learning Spatiotemporal Features with 3D Convolutional Networks', arXiv:1412.0767 [cs.CV] Dec. 2, 2014 (9 pgs).

Yang et al., 'Unsupervised Extraction of Video Highlights Via Robust Recurrent Auto-encoders' arXiv:1510.01442v1 [cs.CV] Oct. 6, 2015 (9 pgs).

* cited by examiner

DIGITAL MEDIA EDITING

CROSS-REFERENCE TO RELATED APPLICATIONS

This application claims the benefit of U.S. 62/291,336, filed Feb. 4, 2016, the disclosure of which is incorporated herein by reference in their entireties.

BACKGROUND

Digital cameras may be used to capture digital videos in a variety of settings. In view of the availability of expanded digital memory, users tend to capture more videos, and increasingly longer videos, as memory consumption becomes less of a concern. Increasing number and length of videos, however, results in inefficiencies in management of video libraries.

Manual review of videos to identify scenes the user finds exciting, entertaining, or otherwise interesting for view may be both time consuming, and resource intensive. For example, scrolling through multiple videos of various lengths to find such scenes burdens processors, memory, and battery of computing devices, such as mobile computing devices. Automated video processing technologies have been developed to identify scenes potentially interesting to the user. However, such video processing technologies may be resource-intensive, particularly with high-resolution, raw-format video data.

Further, after identifying an interesting scene, the user may wish to edit the scene using a digital editing environment. For example, the user may edit the scene to include effects (e.g., slow motion, zoom-in, zoom-out, color effects, and the like), which may enhance the scene, or otherwise affect user enjoyment of the scene. However, the user may undergo a trial-and-error process of adding/removing effects in different combinations, and/or with different effect attributes. Such editing processes may be time and resource intensive, thereby burdening processors, memory, and battery of computing devices, such as mobile computing devices.

SUMMARY

This specification generally relates to digital media editing. More particularly, implementations of the present disclosure are directed to providing suggested edits to one or more moments captured in a digital video.

In some implementations, actions include receiving metadata associated with the digital video, the metadata including data representative of one or more of movement and an environment associated with recording of the digital video, processing the metadata to provide a suggested edit profile including at least one set of effects, the at least one set of effects including one or more effects configured to be applied to at least a portion of the digital video, providing a respective graphical representation of individual effect of the one or more effects within an effect interface, and receiving, through the effect interface, a user selection of a set of effects of the suggested edit profile, and in response, storing, in computer-readable memory, an edit profile comprising the set of effects for application to the digital video. Other embodiments of these aspects include corresponding systems, apparatus, and computer programs, configured to perform the actions of the methods, encoded on computer storage devices.

These and other embodiments may each optionally include one or more of the following features: a processing the metadata to provide a suggested edit profile includes determining that at least one attribute value breaches a threshold, and in response, providing the at least one set of effects; processing the metadata to provide a suggested edit profile includes determining a type of effect to include in the at least one set of effects based on the metadata; determining a type of effect includes comparing at least one metadata value to a threshold value, and one of: including a first effect in the at least one set of effects if the metadata value breaches the threshold value, and including a second effect in the at least one set of effects if the metadata value does not breach the threshold value; each effect is associated with one or more attributes; actions further include receiving user input indicating a modification to at least one attribute; an attribute includes one of a degree of a respective effect, a beginning of a respective effect, an end of a respective effect, and a duration of a respective effect; the at least one set of effects is associated with an event that is identified as an event of interest based on the metadata; the at least one set of effects is associated with an event that is not identified as an event of interest based on the metadata; an effect includes slow motion, fast forward, zoom-in, zoom-out, a color effect, a sound effect, insertion of a music track, a volume effect, a pixilation effect; and the metadata is provided from one or more of a mobile processing device, a digital media device, and an ancillary device.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Implementations of the present disclosure are generally directed to video editing applications. More particularly, implementations of the present disclosure are directed to providing one or more suggested edits to a digital video. In some examples, one or more suggested edits are provided for respective moments captured in the digital video. In some examples, a moment includes a scene, or multiple scenes recorded in the digital video. In some examples, each moment includes a plurality of frames of the digital video. In some implementations, a suggested edit may include one or more effects that may be applied to a respective moment, and are provided based on meta-data corresponding to the digital video. In some examples, a user may select the suggested edit to be applied to the moment. In some examples, the user may modify the suggested edit to provide a modified suggested edit, which may be applied to the moment.

As described in further detail herein, implementations of the present disclosure may include actions of receiving metadata associated with the digital video, the metadata including data representative of one or more of movement and an environment associated with recording of the digital video, processing the metadata to provide a suggested edit profile including at least one set of effects, the at least one set of effects including one or more effects configured to be applied to at least a portion of the digital video, providing a respective graphical representation of individual effect of the one or more effects within an effect interface, and receiving, through the effect interface, a user selection of a set of effects of the suggested edit profile, and in response, storing, in computer-readable memory, an edit profile comprising the set of effects for application to the digital video.

Figure 1:
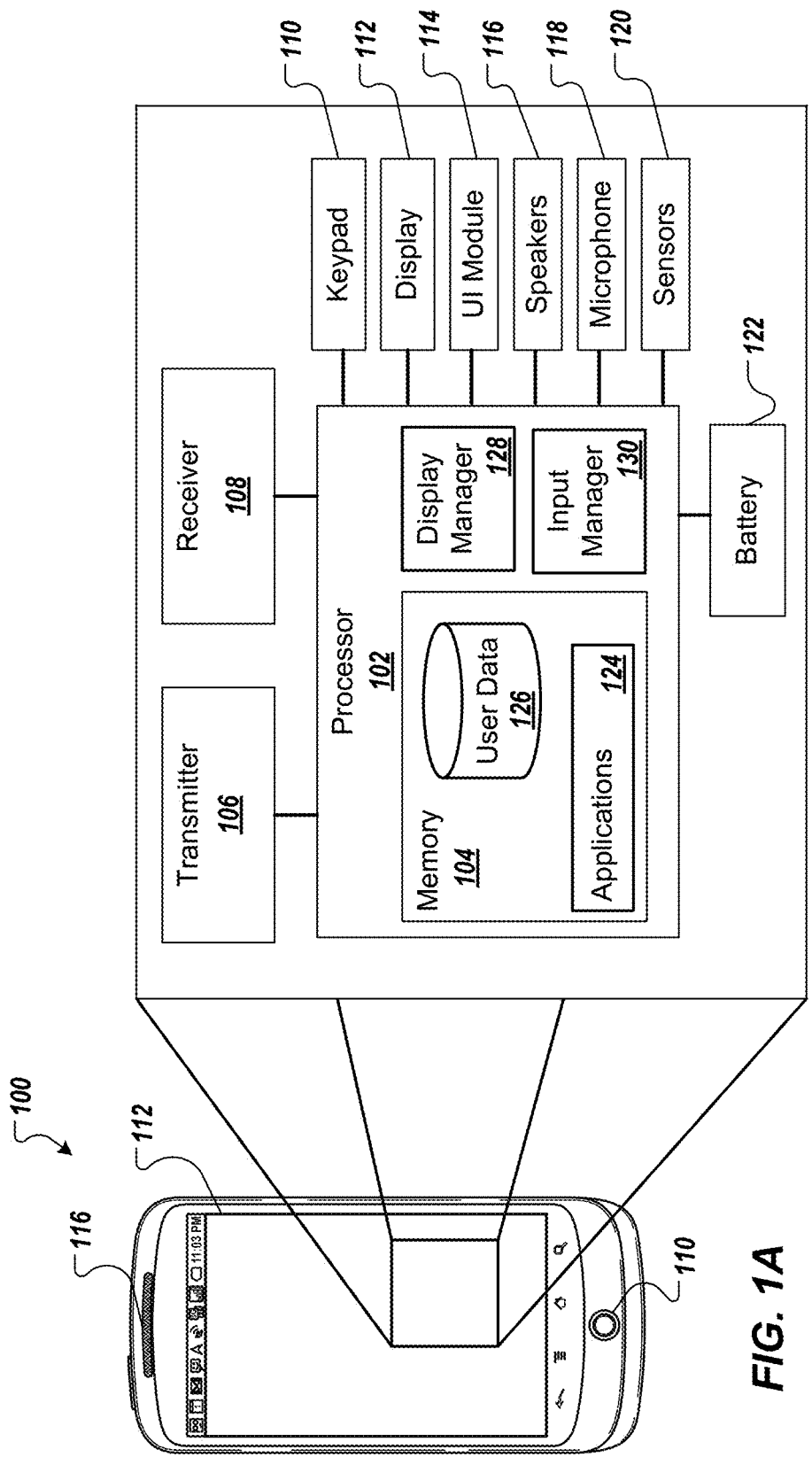
FIGS. 1A and 1B illustrate an example mobile processing device.

FIGS. 1A and 1B illustrate an example mobile processing device 100. In the depicted example, the mobile processing device 100 is provided as a smartphone. It is contemplated, however, implementations of the present disclosure may be realized using video camera devices, tablet computing devices, laptop computers, personal digital assistants (PDAs), mobile phones, or any one of many other known types of suitable mobile processing devices. In the depicted example, the mobile processing device 100 includes one or more processors 102, memory 104 (e.g., computer-readable media, read-only memory (ROM), random access memory (RAM), flash memory, a removable memory card (e.g., SD card), a hard disk, or any combination thereof), a transmitter 106, a receiver 108, a keypad 110 (e.g., a soft key), a display 112, a user-interface (UI) module 114 (e.g., a graphical user interface module for touchscreen devices), speakers 116, a microphone 118, sensors 120, and a battery 122. In some examples, the processor 102 may control each component of the mobile processing device 100 and may access memory 104 to run applications 124, and/or retrieve user data 126, which may be stored in the memory. The transmitter 106 and the receiver 108 transmit and receive signals (e.g., via one or more antennas) to other communication devices, base stations, computers, satellites (e.g., GPS satellites), and/or wireless access points. The keypad 110, the display 112, the speaker 116, and the microphone 118 are input/output devices for communicating with a user. The battery 122 provides power to appropriate components of the mobile processing device.

In some examples, the processor 102 may include a display manager 128 and an input manager 130. The display manager 128 may be operable to manage displayed on the display 112. In some implementations, an operating system running on the mobile device 102 may use the display manager 128 to arbitrate access to the display 112 for a number of applications 124 running on the mobile processing device 100. In some examples, a number of applications 124 may run concurrently on the mobile processing device 100, with each application displayed to the user in respective windows on the display 112. In such examples, the display manager 128 may control which portions of each application 124 are displayed on the display 112. In some implementations, the display manager 128 may control the orientation (e.g., portrait orientation, landscape orientation) of the display 112. In some examples, the input manager 130 may be operable control the handling of data received from a user via one or more input devices of the mobile processing device 100. For example, the input manager 130 may determine which application 124 should be invoked as a result of user received input. In some implementations, the UI module 114 may coordinate with the input devices to a interpret user input. The interpreted input may be evaluated by the input manager 130 to determine which application 124 should be invoked.

In some implementations, the sensors 120 may be responsive to physical movement and/or the physical environment of the mobile processing device 100, and generate data based thereon. Example sensors may include, without limitation, an inertial sensor, an accelerometer, a gyroscope, a compass, a barometer, and a temperature sensor. For example, responsive to movement of the mobile processing device 100, a sensor (e.g., an accelerometer) may provide data indicating attributes of the movement (e.g., force, speed, direction). As another example, responsive to a change in environment of the mobile processing device 100, a sensor (e.g., temperature sensor) may provide data indicating attributes of the change (e.g., increase/decrease in temperature). In accordance with implementations of the present disclosure, and as described in further detail herein, data profiles (e.g., a series of data values) from one or more sensors may be used to provide one or more suggested edits to one or more moments captured in a digital video.

In some implementations, the mobile processing device 100 may provide a digital media editing environment. For example, a digital media editing application may be downloaded to and installed on the mobile processing device 100, which may execute the digital media editing application to provide the digital media editing environment on the display 112 of the mobile processing device 100. Example digital media editing environments are disclosed in commonly assigned U.S. application Ser. No. 14/234,653, filed on Jan. 24, 2014, which issued as U.S. Pat. No. 9,557,885 on Jan. 31, 2017, and which claims priority to U.S. Prov. App. No. 61/521,624, filed on Aug. 9, 2011, and U.S. application Ser. No. 15/400,660, filed Jan. 6, 2017, and which claims priority to U.S. Prov. App. No. 62/276,627, filed Jan. 8, 2016, and U.S. Prov. App. No. 62/291,336, filed Feb. 4, 2016. The disclosures of each of the above-referenced applications are expressly incorporated herein by reference in their entireties.

Figure 2:
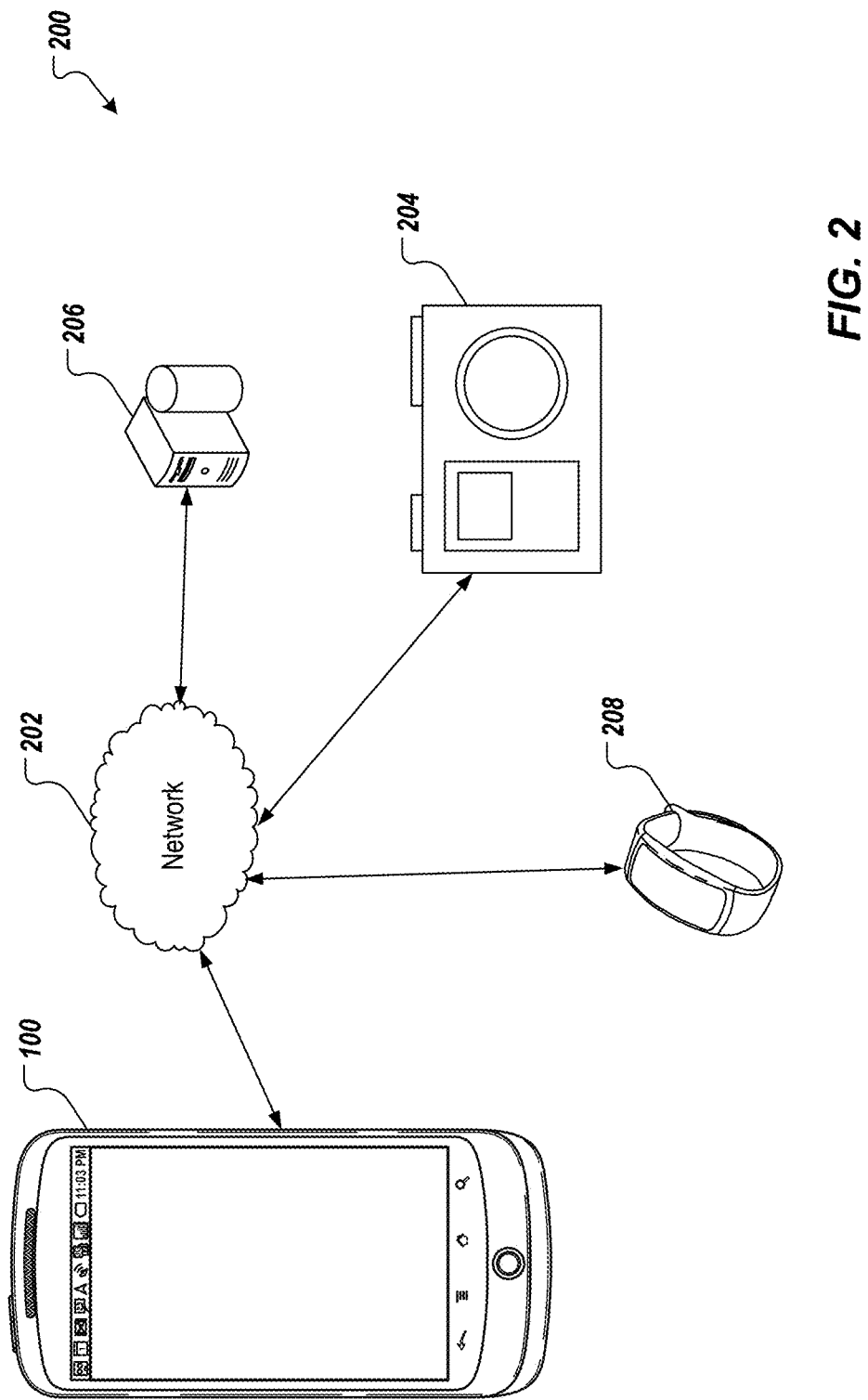
FIG. 2 depicts an example architecture in accordance with implementations of the present disclosure.

FIG. 2 depicts an example architecture 200 in accordance with implementations of the present disclosure. In the depicted example, the architecture 200 includes the mobile processing device 100 (e.g., a smartphone, a tablet computing device), a network 202, a media device 204, a server system 406, and an ancillary device 208.

In some examples, the media device 204 includes any appropriate device for generating and storing, among other functionality, digital media objects (e.g., digital videos). An example media device may include a digital camera that may be used to capture digital images, video, and/or audio (as digital media objects). Example media devices include the GoPro Hero® series of digital video cameras provided by GoPro, Inc. In some examples, the media device 204 stores digital media objects in computer-readable memory. Example computer-readable memory may include removable memory, such as a non-volatile memory card (e.g., a secure digital (SD) storage care developed by the SD Card Association (SDA) for use in portable devices). In some examples, the media device 204 includes one or more components, such as components described above with reference to the mobile processing device 100 (e.g., one or more processors, memory, a transmitter, a receiver, a display, speakers, a microphone, sensors, a battery). In some examples, the media device 204 may provide a digital media editing environment. For example, a digital media editing application may be downloaded to and installed on the media device 204, which may execute the digital media editing application to provide the digital media editing environment.

In some examples, the server systems 206 includes one or more computing devices, and computer-readable memory, and may represent various forms of server systems including, but not limited to a web server, an application server, a proxy server, a network server, or a server farm.

In some examples, the mobile processing device 100, the media device 204, and/or the server system 206 may store one or more digital media units (also referred to herein as digital media objects, or objects) (e.g., a digital video file, a digital image file, a digital audio file). For example, the server system 206 may host one or more computer-implemented services, which may be used (e.g., by a user of the mobile processing device 100) to, for example, store, share, and/or edit digital media objects. Example computer-implemented services may include a computer-implemented social networking service, a computer-implemented micro-blogging service, and a computer-implemented content-sharing service. An example social networking service may include Facebook® provided by Facebook, Inc. An example micro-blogging service may include Twitter® provided by Twitter Inc. Example content-sharing services include image-sharing services and/or video-sharing services. An example content-sharing service includes Instagram® provided by Facebook, Inc. It is contemplated, however, that implementations of the present disclosure may be realized in any appropriate computer-implemented services (e.g., multiple social networking services, multiple micro-blogging services, multiple content-sharing services, and/or any other appropriate computer-implemented service).

In some examples, the mobile processing device 100 communicates with the media device 204, and/or the server system 206 over the network 202 to access objects stored thereby. In some examples, the network 202 may be a public communication network (e.g., the Internet, cellular data network, dialup modems over a telephone network), a wide area network (WAN), a local area network (LAN), a private communications network (e.g., private LAN, leased lines), a wireless network, a wireless connection between devices, or any appropriate combination thereof. In one example, the mobile processing device 100 may communicate with the media device 204 over the network 202 (e.g., as a wireless connection (WiFi, Bluetooth)) to access objects stored by the media device 204. In another example, the mobile processing device 100 may communicate with the server system 206 over the network 202 (e.g., the Internet) to access objects stored by the server system 206.

In the depicted example, the ancillary device 208 is provided as a wearable device (e.g., a fitness tracker, a smartwatch). In some implementations, the ancillary device 208 includes one or more components, such as components described above with reference to the mobile processing device 100 (e.g., one or more processors, memory, a transmitter, a receiver, a display, speakers, a microphone, sensors, a battery). Although depicted as a wearable device, the ancillary device 208 may include any appropriate device that is responsive to movement and/or environment, and that may provide respective data based thereon, as well as able to communicate with other devices over the network 202 (e.g., the Internet, wireless connection (WiFi, Bluetooth)). For example, the ancillary device 208 may be representative of a vehicle telemetry device, which provides vehicle telemetry data (e.g., altitude, speed, pitch, roll, acceleration, yaw) of a vehicle.

In accordance with implementations of the present disclosure, a digital video may be recorded by the media device 204 (e.g., digital video camera), and metadata that describes movement and/or environment associated with recordation of the digital video may be recorded. In some examples, the metadata may be recorded by one or more of the mobile processing device 100, the media device 204, and the ancillary device 208. For example, a user may include a skier, who uses the media device 204 to record digital video (e.g., mounted on a helmet of the skier), while the mobile processing device 100 is in a pocket, and the user is wearing the ancillary device 208. In some examples, in response to beginning recording of the digital video, a signal may be sent to each of the mobile processing device 100, and the ancillary device 208 (e.g., from the media device 204), instructing each to begin recording of metadata. In some examples, in response to ending recording of the digital video, a signal may be sent to each of the mobile processing device 100, and the ancillary device 208 (e.g., from the media device 204), instructing each to end recording of metadata. In some examples, the mobile processing device 100, and/or the ancillary device 208 each regularly record metadata, and cache metadata (e.g., regardless of activities of the media device 204). In some examples, in response to ending recording of the digital video, a request is sent to the mobile processing device 100, and/or the ancillary device 208 for historical metadata (e.g., going back to the time, at which recording of the digital video began). In some implementations, recorded metadata (e.g., recorded by the media device 204, the mobile processing device 100, and/or the ancillary device 208) is associated with the digital video (e.g., is appended to a file containing the digital video).

In accordance with implementations of the present disclosure, and as introduced above, the metadata includes data indicative of movement and/or an environment associated with the digital video. In some examples, metadata may also include information about the video digital itself, the device used to capture the video, the environment or setting in which a video is captured, or any other information associated with the capture of the digital video. Example metadata may include, without limitation, motion data, speed data, acceleration data, altitude data, GPS data, compass data, temperature data, and barometric data. For example, and continuing with the example of the user being a skier, metadata may include acceleration data representative of the acceleration of the media device 204 carried by the user as a digital video is recorded while skiing, as well as accelerations of the mobile processing device 100 and the ancillary device 208, compass data of the mobile processing device 100, a heart rate of the user, and any appropriate metadata captured during recording of the digital video.

In some implementations, the metadata may be processed to identify potential events of interest within the digital video (e.g., to identify moments within the digital video). Systems and methods for identifying interesting events in digital videos based on metadata are described in commonly assigned, U.S. application Ser. No. 14/513,149, filed on Oct. 13, 2014, the disclosure of which is expressly incorporated herein by reference in the entirety.

In accordance with implementations of the present disclosure, metadata may be processed to provide one or more suggested edits to a digital video. In some examples, one or more suggested edits are provided for respective moments captured in the digital video. In some examples, a moment includes a scene, or multiple scenes recorded in the digital video. In some implementations, a suggested edit may include one or more effects that may be applied to one or more frames of the digital video. Example effects may include, without limitation, slow motion, zoom-in, zoom-out, color effects, sound effects, music tracks, volume, pixilation, and the like.

In some implementations, a video editing module (e.g., of a video editing application executing on one of the mobile processing device 100, the media device 204, the server system 206) analyzes metadata associated with a digital video to identify scenes of interest (e.g., which include identified events of interest, and/or activities). Examples of events of interest may be indicated by abrupt changes or anomalies in the metadata, such as a peak or valley in metadata maximum or minimum values within the metadata, metadata exceeding or falling below particular thresholds, metadata within a threshold of predetermine values (for instance, within 20 meters of a particular location or within the particular location), and the like. The video editing module may identify events of interest based on any other type of metadata, such as a heart rate of a user, orientation information, and the like.

In some examples, the video editing module may identify any of the following as an event of interest within the metadata: a greater than threshold change in acceleration or velocity within a pre-determined period of time, a maximum or above-threshold velocity or acceleration, a maximum or local maximum altitude, a maximum or above-threshold heart rate or breathing rate of a user, a maximum or above-threshold audio magnitude, a user location within a pre-determined threshold distance from a pre-determined location, a threshold change in or pre-determined orientation of the camera or user, a proximity to another user or location, a time within a threshold of a pre-determined time, a pre-determined environmental condition (such as a particular weather event, a particular temperature, a sporting event, a human gathering, or any other suitable event), or any other event associated with particular metadata.

In some implementations, a user may manually indicate an event of interest during capture of the video, and the metadata may reflect such manual indication(s). For example, a user may press a button on the media device 204 (or a camera remote), or otherwise interact with the media device 204 during the capture of video to tag an instant in the video as including an event of interest. For example, if a user is capturing video while skiing, and presses a button of the media device 204 associated with manually tagging an event of interest, the media device 204 creates metadata associated with the captured video indicating that the video includes an event of interest, and indicating a time or portion within the captured video, at which the tagged event of interest occurs. In some examples, the manual tagging of an event of interest by a user while capturing video is stored as a flag within a resulting digital video file. The location of the flag within the digital video file corresponds to a time within the video, at which the user manually tags the event of interest.

In some implementations, a user may manually indicate an event of interest during capture of the video using a spoken command or audio signal. For example, a user may say "Tag," or "Tag my moment," during the capture of video to tag the video as including an event of interest. The audio-tagged event of interest may be indicated within metadata associated with the captured video. The spoken command may be pre-programmed, for example, by a manufacturer, programmer, or seller of the media device 204, or may be customized by a user of the media device 204. For example, a user may speak a command or other audio signal into the media device 204 during a training period (e.g., in response to configuring the media device 204 into a training mode, or in response to the selection of a button or interface option associated with training the media device 204 to receive a spoken command). An audio pattern is stored in the media device 204, and, during a video capture, the media device 204 may identify the audio pattern in a spoken command or audio signal received from the user, and may manually tag an event of interest during the capture of video in response to detecting the stored audio pattern within the received spoken command or audio signal.

In some implementations, the video editing module may identify events of interest based on audio captured in conjunction with the video. In some examples, the video editing module identifies events of interest based on one or more spoken words or phrases in captured audio. For example, if audio of an excited utterance of a user (e.g., "Holy Smokes!") is captured, the video editing module may determine that an event of interest occurred contemporaneously with the excited utterance (e.g., within the previous 5 seconds or other threshold of time). As another example, if audio of a user saying an anticipatory excited utterance (e.g., "Oh no! Watch out!") is captured, the video editing module may determine that an event of interest is about to occur (e.g., within the next 5 seconds, or other threshold of time). In addition to identifying events of interest based on captured dialogue, the video editing module may identify an event of interest based on captured sound effects, captured audio exceeding a magnitude or pitch threshold, or captured audio satisfying any other suitable criteria.

In some implementations, the video editing module may identify video that does not include events of interest. For example, and as describe further herein, the video editing module may identify video that is associated with metadata patterns determined to not be of interest to a user. Such patterns may include metadata associated with a below-threshold movement, a below-threshold luminosity, audio data that does not include dialogue or other notable sound effects, and the like. In some examples, and as described in further detail herein, video determined to not include events of interest may still have suggested edits associated therewith.

As described herein, the video editing module may identify events of interest based on activities and/or environment associated with recording of the video. For example, a jump while skiing, or a crash while skateboarding, may be considered events of interest. In some implementations, activities may be identified by an activity identifier module (e.g., of a video editing application executing on one of the mobile processing device 100, the media device 204, the server system 206) based on metadata associated with the video. Continuing with the previous example, metadata associated with a particular altitude and a parabolic upward and then downward velocity may be identified as a "jump" activity, and a sudden slowdown in velocity and accompanying negative acceleration (deceleration) may be identified as a "crash" activity.

In some implementations, the activity identifier module may receive a manual identification of an activity within videos from one or more users. In some examples, activities may be tagged during the capture of video. For example, if a user is about to capture video while performing a jump, the user may manually tag the video being captured or about to be captured as "jump."

In accordance with implementations of the present disclosure, each effect, or a combination of effects that may be applied to the digital video may be suggested based on the metadata. For example, values of the metadata may be compared to one or more threshold values, and, if the values meet the thresholds, a corresponding effect, or multiple effects may be suggested (e.g., as described above with respect to identifying events of interest). For example, metadata may include acceleration values, which may be compared to one or more thresholds. In some examples, an acceleration value meeting a first threshold may be indicative of a beginning of an event (e.g., rapid acceleration/deceleration of the skier, a maneuver (jump, flip) performed by the skier). In response to the acceleration value exceeding the first threshold, a suggested effect (e.g., slow motion) may be provided. In some examples, the suggested effect may be associated with a corresponding timestamp of the digital video, and/or a particular frame (e.g., based on unique frame identifier) of the digital video.

In some implementations, one or more attributes may be provided for each suggested effect. Example attributes may include, without limitation, degree, and duration. For example, if the suggested effect includes slow motion, the degree of slow motion (e.g., three-quarter speed, half speed, quarter speed) may be provided based on the extent, to which the acceleration value exceeds the first threshold. For example, for a first acceleration, a first degree may be provided, and for a second acceleration, a second degree may be provided, where, for example, the first acceleration is greater than the second acceleration, and the first degree (e.g., three-quarter speed) is slower than the second degree (e.g., quarter speed). In other words, for more rapid accelerations, a slower motion effect may be suggested than for less rapid accelerations.

In some examples, an acceleration value meeting a second threshold may be indicative of an end of an event (e.g., rapid acceleration/deceleration of the skier, a maneuver (jump, flip) performed by the skier). In response to the acceleration value meeting the second threshold, an end to the suggested effect (e.g., slow motion) may be provided. In some examples, the end of the suggested effect may be associated with a corresponding timestamp of the digital video, and/or a particular frame (e.g., based on unique frame identifier) of the digital video. In some examples, the suggested effect may be associated with a duration (e.g., in seconds, minutes).

In some implementations, metadata may be indicative of an uninteresting event. For example, a period of time in the digital video, during which nothing of significant consequence occurs (e.g., a skier slowly skiing along a cat-track for a matter of minutes), may be determined to be an uninteresting event. Metadata (e.g., accelerometer data, GPS data, compass data) may be indicative of such an event (e.g., relatively constant, relatively slow speed, in a relatively constant direction). Consequently, a corresponding effect may be suggested (e.g., cropping of the digital video during the period of the event, fast-forward of the digital video during the period of the event).

In accordance with implementations of the present disclosure, a suggested edit profile may be provided, which includes one or more suggested effects for editing the digital video. In some implementations, for each of one or more events, a set of effects is provided. Continuing with the example above, a digital video may include a skier skiing slowly along a cat-track before rapidly accelerating and performing a jump. Accordingly, an example suggested edit profile may include a first set of effects, and a second set of effects, the first set of effects corresponding to the slow ski along the cat-track, and the second set of effects corresponding to the rapid acceleration and jump.

In some implementations, each set of effects includes one or more suggested effects that may be applied to the digital video, corresponding to a respective event. Continuing with the example above, a first set of effects may be provided for the slow ski along the cat-track, and a second set of effects may be provided for the rapid acceleration and jump. For example, the first set of effects may include cropping of the slow ski along the cat-track. As another example, the first set of effects may include fast forwarding of the slow ski along the cat-track, and a suggested music track (e.g., the theme music to the Benny Hill Show). As another example, the second set of effects may include slow motion of the rapid acceleration and jump, and a reduction in volume of audio.

In some examples, for each suggested effect, one or more attributes (e.g., a degree, and/or duration of the suggested effect) may be provided. For example, the first set of effects may include a degree of fast forwarding (e.g., double speed) for the duration of the slow ski along the cat-track. As another example, the second set of effects may include a degree of slow-motion (e.g., half speed) for the duration of the rapid acceleration and jump.

In some implementations, the suggested edit profile is provided as computer-readable file that stores a data set that includes data sub-sets. For example, the suggested edit profile (SEP) includes one or more sets of effects ($SE_1, \ldots, SE_n$). In some examples, each set of effects includes one or more effects, each effect defined as a tuple of attributes (e.g., $[T_1, a_{1,1}, a_{1,p}]$; $[T_2, a_{2,1}, \ldots, a_{2,q}]$). For purposes of illustration, an example suggested edit profile may include:

$$SEP \rightarrow ([T_1, a_{1,1}, a_{1,2}, a_{1,3}]^1; [T_2, a_{2,1}, a_{2,2}, a_{2,3}]^2)$$

In this example, the SEP includes a first set of effects ($[\ldots]^1$), and a second set of effects ($[\ldots]^2$), where T indicates a type of effect (e.g., slow motion, fast forward), and a indicates respective attributes of the effect (e.g., degree, duration). Continuing with the example above, the first set of effects may include an effect of fast forwarding (e.g., $T_1=FF$) at double speed (e.g., $a_{1,1}=2.0$) for the duration of the slow ski along the cat-track (e.g., $a_{1,2}=t_{start}$, and $a_{1,3}=t_{stop}$; where t is a timestamp of the video, or a frame identifier). As another example, the second set of effects may include an effect slow-motion (e.g., $T_2=SM$) at half speed (e.g., $a2,1=0.5$) for the duration of the rapid acceleration and jump (e.g., $a_{2,2}=t_{start}$, and $a_{2,3}=t_{stop}$; where t is a timestamp of the video, or a frame identifier). Although each of the above-described example sets of effects includes a single effect, it is contemplated that a set of effects may include multiple effects (e.g., slow motion, volume reduction, color change to black-white).

In some implementations, a graphical representation of the suggested edit profile may be displayed to the user, and the user may accept one or more of the sets of effects, and/or modify one or more effects in the one or more sets of effects before accepting. For example, each set of effects may be visually displayed to the user in a digital media editing application, to enable the user to accept, delete, and/or modify one or more of the sets of effects in a suggested edit profile.

Figure 3A:
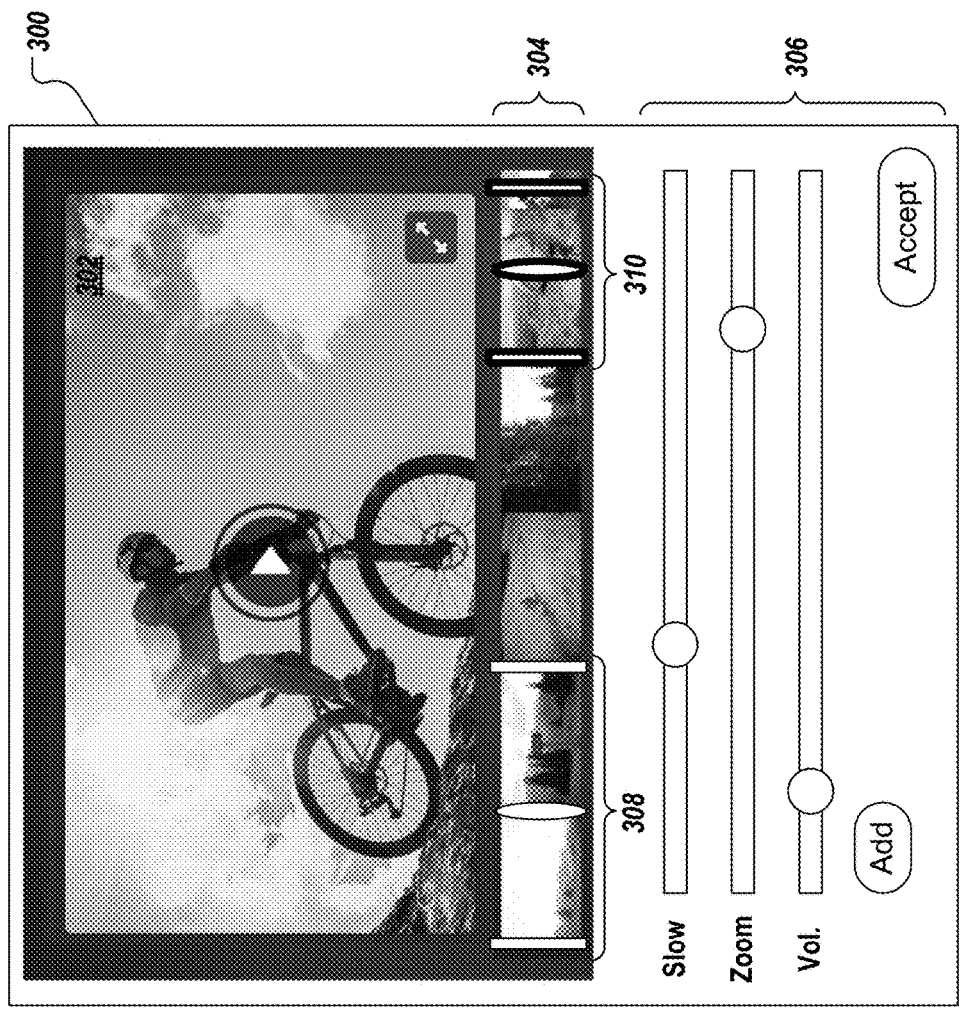
FIGS. 3A and 3B depict example screenshots of a digital media editing application in accordance with implementations of the present disclosure.
Figure 3B:
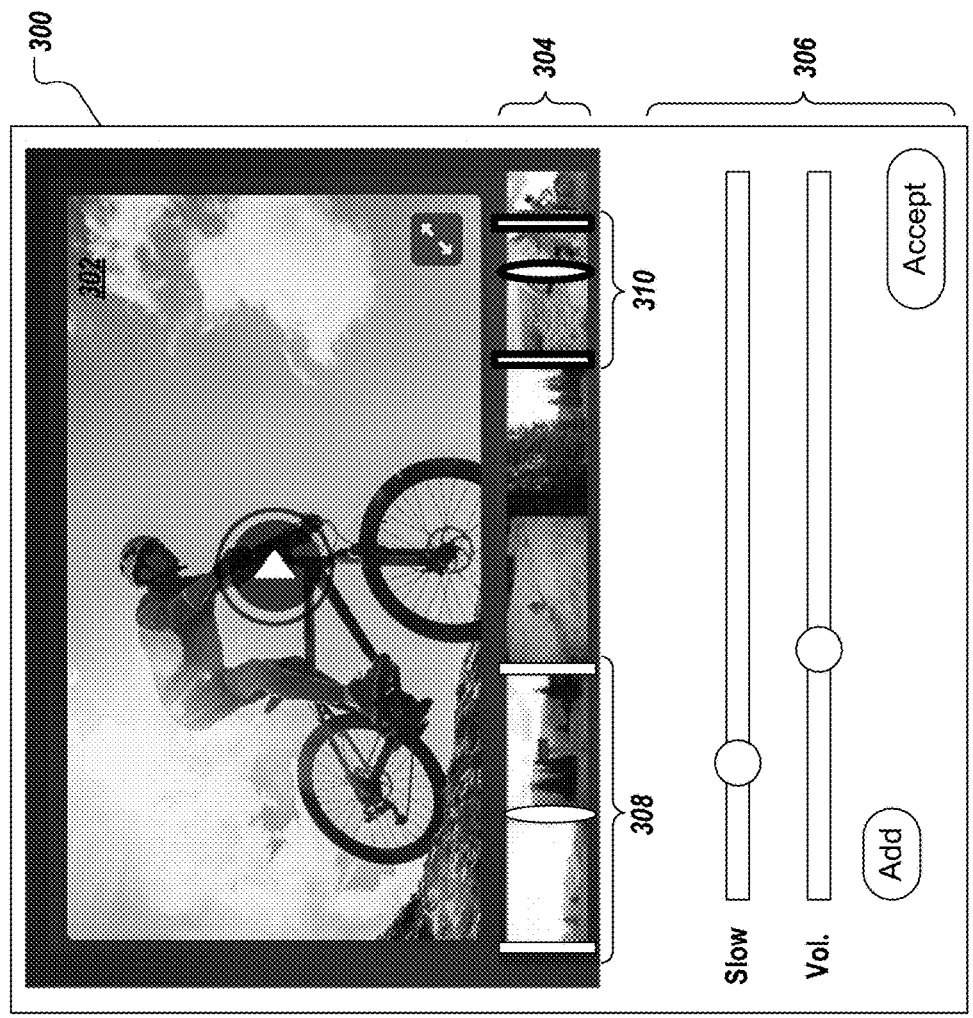

FIGS. 3A and 3B depict example screenshots of a digital media editing application in accordance with implementations of the present disclosure. With particular reference to FIG. 3A, an editing environment 300 is displayed (e.g., on a display of the mobile processing device 100), and, in the depicted example, includes a video preview 302, a timeline view 304, and an effect interface 306. In the example of FIG. 3A, a first set of effects is indicated by a first graphical representation 308, and a second set of effects is indicated by a second graphical representation 310 within the timeline view 304.

In some implementations, in response to user selection of a graphical representation, effects and respective attributes of the effects are displayed in the effect interface 306. In the example of FIG. 3A, a user has selected the second set of effects (e.g., has tapped on the second graphical representation 310), and in response, suggested effects of slow motion (slow), zoom, and volume, as well as suggested degrees of each, are graphically depicted in the effect interface 306. In the depicted example, each effect is associated with a slider-bar that enables the user to change a setting of the attribute. In some examples, an interface may be provided to enable the user to remove a suggested effect. In the depicted example, an interface is provided to enable the user to add an effect. In some examples, the user may preview the video, including the respective sets of effects as applied to the video, in the video preview 302.

FIG. 3B depicts user edits to the example effects graphically represented in the effect interface 306. For example, and as compared to the setting of FIG. 3A, the user has adjusted the respective degree of each of the slow motion effect, and the volume effect, and has removed the zoom effect. In some examples, when the user is satisfied with the edits, the user may select an accept interface to commit the edits to the video.

In some implementations, and as noted above, the edits may be provided in an edit profile provided as computer-readable file that is appended to, or otherwise associated with a file containing the digital video (e.g., a digital video file). In some examples, when the video is subsequently played (e.g., by a video player), the edit profile is read as a set of instructions for applying respective effects as the video is played. In this manner, an edited video is not stored as a separate digital video file, from the original video. In another example, an edited digital video is provided based on the edit profile, and is stored as a separate digital video file (e.g., separate from the digital video file of the original video).

Figure 4:
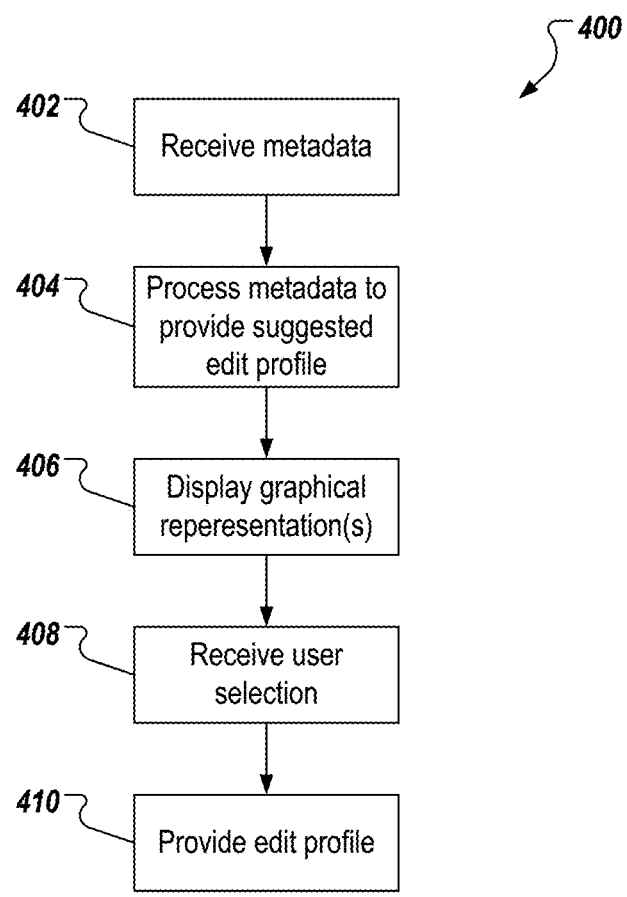
FIG. 4 depicts an example process that may be executed in accordance with implementations of the present disclosure.

FIG. 4 depicts an example process 400 that may be executed in accordance with implementations of the present disclosure. In some examples, the example process 400 may be provided by one or more computer-executable programs executed using one or more computing devices (e.g., the mobile computing device 100). In some examples, the example process 400 is executed to provide an edit profile that includes one or more suggested edits to a digital video.

Metadata associated with the digital video is received (402). For example, a video editing module (e.g., of a video editing application executing on one of the mobile processing device 100, the media device 204, the server system 206). In some examples, the metadata is received from one or more of the mobile processing device 100, the media device 204, and the ancillary device 208 of FIG. 2. In some examples, the metadata includes data representative of one or more of movement and an environment associated with recording of the digital video. The metadata is processed to provide a suggested edit profile (404). For example, the video editing module processes the metadata to identify, as described in further detail herein, a greater than threshold change in acceleration or velocity within a pre-determined period of time, a maximum or above-threshold velocity or acceleration, a maximum or local maximum altitude, a maximum or above-threshold heart rate or breathing rate of a user, a maximum or above-threshold audio magnitude, a user location within a pre-determined threshold distance from a pre-determined location, a threshold change in or pre-determined orientation of the camera or user, a proximity to another user or location, a time within a threshold of a pre-determined time, a pre-determined environmental condition (such as a particular weather event, a particular temperature, a sporting event, a human gathering, or any other suitable event), or any other event associated with particular metadata. In some examples, the suggested edit profile includes at least one set of effects, the at least one set of effects including one or more effects that can be applied to at least a portion of the digital video.

A respective graphical representation of each effect of the one or more effects is displayed within an effect interface (406). For example, and as depicted in the examples of FIGS. 3A and 3B, an editing environment may be displayed (e.g., on a display of the mobile processing device 100), and may include respective graphical representations of sets of effects, and/or individual effects, provided in the suggested edit profile. A user selection of a set of effects of the suggested edit profile is received (408). For example, the user selects a set of effects using an effect interface displayed in the editing environment. An edit profile is provided (410). for example, and in response to one or more user selections, an edit profile is provided from the suggested edit profile. In some examples, the edit profile includes at least one set of effects of the suggested edit profile, whether or not modified by the user. In some examples, the edit profile includes the set of effects for application to the digital video.

Although described in the context of a mobile device application operating on a mobile processing device, it is contemplated that implementations of the present disclosure, and all of the functional operations provided herein, may be realized in any suitable type of digital electronic circuitry, or in computer software, firmware, or hardware, including the structures disclosed in this specification and their structural equivalents, or in combinations of one or more of them. Implementations of the present disclosure may also be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this disclosure may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations of the present disclosure may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

While this disclosure includes some specifics, these should not be construed as limitations on the scope of the disclosure or of what may be claimed, but rather as descriptions of features of example implementations of the disclosure. Certain features that are described in this disclosure in the context of separate implementations may also be provided in combination in a single implementation. Conversely, various features that are described in the context of a single implementation may also be provided in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations of the present disclosure have been described. Other implementations are within the scope of the following claims. For example, the actions recited in the claims may be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for providing an edit profile comprising one or more suggested edits to a digital video, the method being executed by one or more processors of a computing device and comprising:
  receiving, by the one or more processors, metadata associated with the digital video, the metadata comprising data representative of a movement and an environment associated with recording of the digital video;
  processing, by the one or more processors, the metadata to provide a suggested edit profile comprising at least one set of effects, the at least one set of effects comprising one or more effects configured to be applied to at least a portion of the digital video, the suggested edit profile determined based on the movement and the environment;
  providing, by the one or more processors, a respective graphical representation of individual effect of the one or more effects within an effect interface; and
  receiving, by the one or more processors, and through the effect interface, a user selection of a set of effects of the suggested edit profile, and in response, storing, in computer-readable memory, an edit profile comprising the set of effects for application to the digital video;
  wherein the determination of the suggested edit profile based on the movement and the environment includes:
    determining a first suggested edit profile based on the movement being of a first type of movement and the environment being of a first type of environment;
    determining a second suggested edit profile based on the movement being of a first type of movement and the environment being of a second type of environment;
    determining a third suggested edit profile based on the movement being of a second type of movement and the environment being of the first type of environment; and
    determining a fourth suggested edit profile based on the movement being of the second type of movement and the environment being of the second type of environment;

wherein:
the first suggested edit profile is different from the second suggested edit profile, the third suggested edit profile, and the fourth suggested edit profile
the second suggested edit profile is different from the third suggested edit profile, and the fourth suggested edit profile; and
the third suggested edit profile is different from the fourth suggested edit profile.

2. The method of claim 1, wherein processing the metadata to provide a suggested edit profile comprises determining that at least one attribute value breaches a threshold, and in response, providing the at least one set of effects.

3. The method of claim 1, wherein processing the metadata to provide a suggested edit profile comprises determining a type of effect to include in the at least one set of effects based on the metadata.

4. The method of claim 1, wherein determining a type of effect comprises comparing at least one metadata value to a threshold value, and one of: including a first effect in the at least one set of effects if the metadata value breaches the threshold value, and including a second effect in the at least one set of effects if the metadata value does not breach the threshold value.

5. The method of claim 1, wherein each effect is associated with one or more attributes.

6. The method of claim 5, further comprising receiving user input indicating a modification to at least one attribute.

7. The method of claim 5, wherein an attribute comprises one of a degree of a respective effect, a beginning of a respective effect, an end of a respective effect, and a duration of a respective effect.

8. The method of claim 1, wherein the at least one set of effects is associated with an event that is identified as an event of interest based on the metadata.

9. The method of claim 1, wherein the at least one set of effects is associated with an event that is not identified as an event of interest based on the metadata.

10. The method of claim 1, wherein an effect comprises slow motion, fast forward, zoom-in, zoom-out, a color effect, a sound effect, insertion of a music track, a volume effect, a pixilation effect.

11. A non-transitory computer-readable storage medium coupled to one or more processors and having instructions stored thereon which, when executed by the one or more processors, cause the one or more processors to perform operations providing an edit profile comprising one or more suggested edits to a digital video, the operations comprising:
receiving metadata associated with the digital video, the metadata comprising data representative of a movement and an environment associated with recording of the digital video;
processing the metadata to provide a suggested edit profile comprising at least one set of effects, the at least one set of effects comprising one or more effects configured to be applied to at least a portion of the digital video, the suggested edit profile determined based on the movement and the environment;
providing a respective graphical representation of individual effect of the one or more effects within an effect interface; and
receiving and through the effect interface, a user selection of a set of effects of the suggested edit profile, and in response, storing, in computer-readable memory, an edit profile comprising the set of effects for application to the digital video;

wherein the determination of the suggested edit profile based on the movement and the environment includes:
determining a first suggested edit profile based on the movement being of a first type of movement and the environment being of a first type of environment;
determining a second suggested edit profile based on the movement being of a first type of movement and the environment being of a second type of environment;
determining a third suggested edit profile based on the movement being of a second type of movement and the environment being of the first type of environment; and
determining a fourth suggested edit profile based on the movement being of the second type of movement and the environment being of the second type of environment;
wherein:
the first suggested edit profile is different from the second suggested edit profile, the third suggested edit profile, and the fourth suggested edit profile
the second suggested edit profile is different from the third suggested edit profile, and the fourth suggested edit profile; and
the third suggested edit profile is different from the fourth suggested edit profile.

12. The non-transitory computer-readable storage medium of claim 11, wherein processing the metadata to provide a suggested edit profile comprises determining that at least one attribute value breaches a threshold, and in response, providing the at least one set of effects.

13. The non-transitory computer-readable storage medium of claim 11, wherein processing the metadata to provide a suggested edit profile comprises determining a type of effect to include in the at least one set of effects based on the metadata.

14. The non-transitory computer-readable storage medium of claim 11, wherein determining a type of effect comprises comparing at least one metadata value to a threshold value, and one of: including a first effect in the at least one set of effects if the metadata value breaches the threshold value, and including a second effect in the at least one set of effects if the metadata value does not breach the threshold value.

15. A system, comprising:
a data source; and
a computing device having a computer-readable storage device having instructions stored thereon which, when executed by the computing device, cause the computing device to perform operations for providing an edit profile comprising one or more suggested edits to a digital video, the operations comprising:
receiving metadata associated with the digital video, the metadata comprising data representative of a movement and an environment associated with recording of the digital video,
processing the metadata to provide a suggested edit profile comprising at least one set of effects, the at least one set of effects comprising one or more effects configured to be applied to at least a portion of the digital video, the suggested edit profile determined based on the movement and the environment,
providing a respective graphical representation of individual effect of the one or more effects within an effect interface, and
receiving and through the effect interface, a user selection of a set of effects of the suggested edit profile, and in response, storing, in computer-readable memory, an edit profile comprising the set of effects for application to the digital video;
wherein the determination of the suggested edit profile based on the movement and the environment includes:
determining a first suggested edit profile based on the movement being of a first type of movement and the environment being of a first type of environment;
determining a second suggested edit profile based on the movement being of a first type of movement and the environment being of a second type of environment;
determining a third suggested edit profile based on the movement being of a second type of movement and the environment being of the first type of environment; and
determining a fourth suggested edit profile based on the movement being of the second type of movement and the environment being of the second type of environment;
wherein:
the first suggested edit profile is different from the second suggested edit profile, the third suggested edit profile, and the fourth suggested edit profile the second suggested edit profile is different from the third suggested edit profile, and the fourth suggested edit profile; and
the third suggested edit profile is different from the fourth suggested edit profile.

16. The system of claim 15, wherein processing the metadata to provide a suggested edit profile comprises determining that at least one attribute value breaches a threshold, and in response, providing the at least one set of effects.

17. The system of claim 15, wherein processing the metadata to provide a suggested edit profile comprises determining a type of effect to include in the at least one set of effects based on the metadata.

18. The system of claim 15, wherein determining a type of effect comprises comparing at least one metadata value to a threshold value, and one of: including a first effect in the at least one set of effects if the metadata value breaches the threshold value, and including a second effect in the at least one set of effects if the metadata value does not breach the threshold value.

19. The system of claim 15, wherein each effect is associated with one or more attributes.

* * * * *